United States Patent [19]

Robert

[11] Patent Number: 5,143,331

[45] Date of Patent: Sep. 1, 1992

[54] ARRANGEMENT AND PROCEDURE FOR AUTOMATICALLY MOUNTING A UNIT OF EQUIPMENT ON A SUPPORT, FOR EXAMPLE A LIGHTING AND/OR INDICATING LAMP UNIT ON A MOTOR VEHICLE

[75] Inventor: Francois Robert, Pont, France

[73] Assignee: Valeo Vision, Bobigny, France

[21] Appl. No.: 711,858

[22] Filed: Jun. 7, 1991

[30] Foreign Application Priority Data

Jun. 8, 1990 [FR] France .............................. 90 07129

[51] Int. Cl.⁵ .............................................. G12B 9/00
[52] U.S. Cl. ................................ 248/27.1; 248/222.4; 403/254; 403/353
[58] Field of Search ...................... 248/27.1, 27.3, 544, 248/220.2, 222.4; 403/353, 254, 255

[56] References Cited

U.S. PATENT DOCUMENTS

| | | | |
|---|---|---|---|
| 2,315,350 | 3/1943 | Rappl | 403/254 |
| 3,591,793 | 6/1971 | McKim | 248/27.1 X |
| 3,986,318 | 10/1976 | McConnell | 403/353 X |
| 4,227,594 | 10/1980 | Kluger | 248/27.3 X |
| 5,045,655 | 9/1991 | Ludwig et al. | 248/27.1 X |

FOREIGN PATENT DOCUMENTS

| | | | |
|---|---|---|---|
| 1436817 | 3/1966 | France . | |
| 0797732 | 7/1958 | United Kingdom | 248/222.4 |

Primary Examiner—Ramon O. Ramirez
Attorney, Agent, or Firm—Dennison, Meserole, Pollack & Schneider

[57] ABSTRACT

An indicating lamp unit or the like is mounted on a wall of a motor vehicle body through mounting pins carried by the lighting unit and carrying retaining means which fit in holes formed in the body wall. Each mounting hole in the body wall is of banjo shape, having a first part through which the retaining means can freely pass and a narrower second part which hold the retaining means securely when the lighting unit is moved sideways. Each of the said retaining means comprises a retaining ring having a peripheral groove defining a middle zone bounded by a pair of generally transverse flanks, which engage on either side of the narrow second part of the mounting hole so as to retain the retaining ring to the wall against movement in either longitudinal direction.

9 Claims, 5 Drawing Sheets

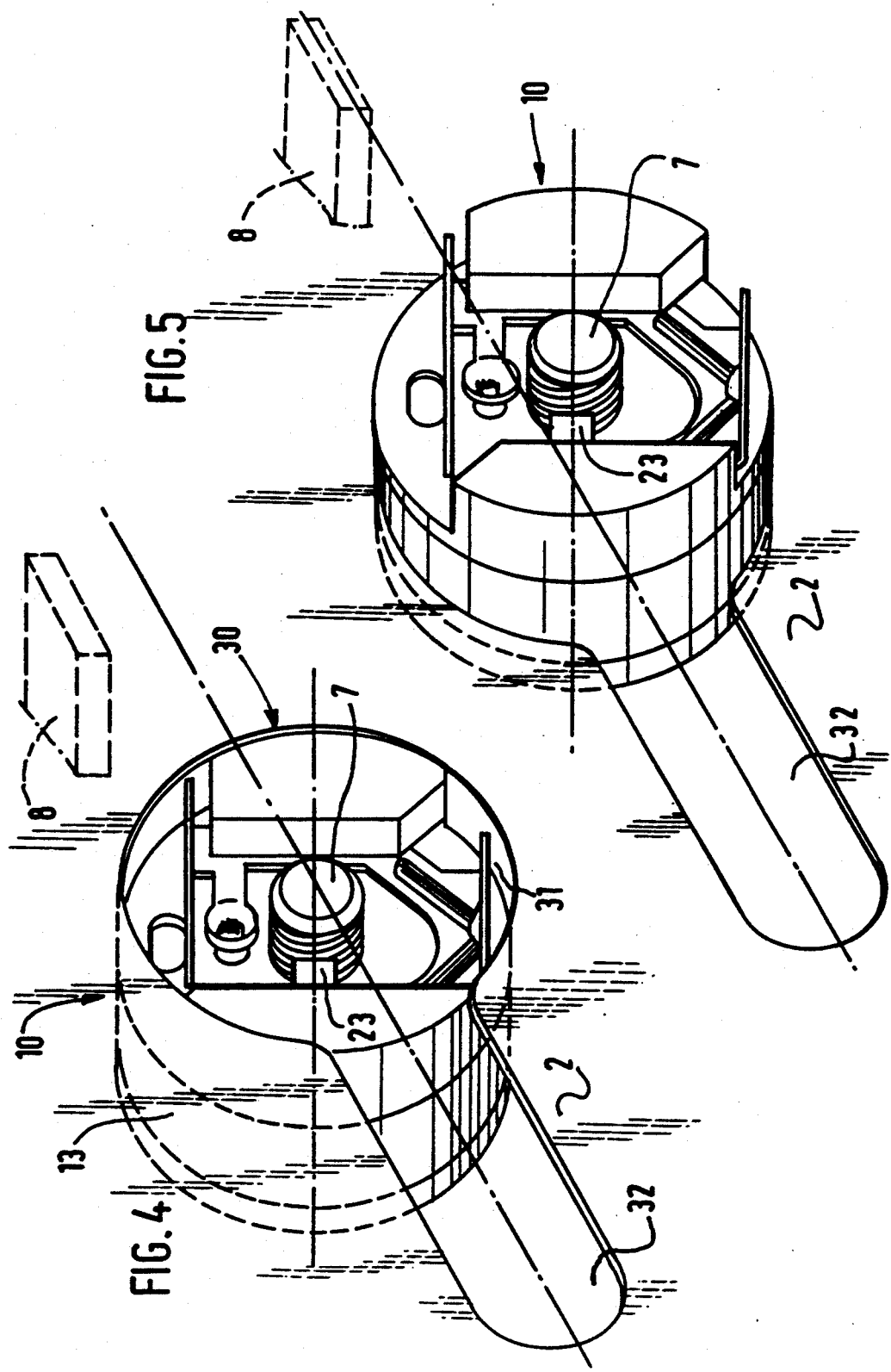

ARRANGEMENT AND PROCEDURE FOR AUTOMATICALLY MOUNTING A UNIT OF EQUIPMENT ON A SUPPORT, FOR EXAMPLE A LIGHTING AND/OR INDICATING LAMP UNIT ON A MOTOR VEHICLE

FIELD OF THE INVENTION

This invention relates to an arrangement comprising a support and a unit of equipment removably mounted on the support, and a precedure or method for automatically fitting the said unit to the said support. The arrangement and method of fitting are particularly applicable to the mounting of a lighting and/or indicating lamp unit on a motor vehicle.

BACKGROUND OF THE INVENTION

In a motor vehicle, such a lighting or indicating lamp unit is conventionally mounted by means of bolts and nuts. However, this type of fastening is generally unsuitable for use with automatic fitting systems using robotic equipment, and alternative methods of mounting the unit on the vehicle have therefore been sought.

Systems for fastening components of various kinds on motor vehicles by means of clips are well known. However, as far as units such as lights or blocks of lights, either for illumination or for indicating purposes, or both, are concerned, these are relatively heavy and large, and are subjected to increases in temperature when in use. Under these circumstances, fastening clips, if used, must have sufficient mechanical strength and elasticity to be able to avoid any damage to themselves during mounting, and they must retain all of their capabilities in spite of any temperature variations. For these reasons, metal clips are conventionally used.

During fitting of such a unit to the vehicle using metal clips, it often happens that when the clips are being presented or offered up to the holes in which they are to be received, the unit may slip slightly and cause the clips to scratch the support. The result is that the anti-corrosion coatings that are usually applied to the vehicle body become damaged, and this gives rise to the probability of eventual corrosion.

In addition, removal of the unit, which may be required for service or maintenance purposes for example, is rendered somewhat difficult and calls for the use of special tools.

DISCUSSION OF THE INVENTION

An object of the invention is to overcome the above mentioned drawbacks. A further object is to provide a fastening means which enables the user of the vehicle to remove the unit from the vehicle, and then to refit it, in a particularly simple and easy way.

According to the invention in a first aspect, a fastening means is provided for the automatic fitting of an apparatus, or unit of equipment, to a support, and more particularly for the fitting of a lighting and/or indicating means to a vehicle, the fastening means being of the kind comprising: at least one mounting pin, adapted to pass through a wall of the said support via a mounting hole formed in the latter; and retaining means adapted to engage on the said mounting pin and to bear against the said wall whereby to secure the said apparatus (such as lighting and/or indicating means) thereto, is characterised in that:

(a) the said mounting hole is in the form of a locking hole comprising a first part, the transverse dimensions of which are adapted to permit the said retaining means to pass freely through it, and a second part extending the said first part laterally, the dimensions of the said second part being smaller than those of the said retaining means whereby to ensure that the latter is retained in the said second part of the hole; and (b) the said retaining means comprise a retaining ring having two generally transverse flanks, separated by a middle zone defining a groove, and having transverse dimensions which are smaller than those of the said second part of the mounting hole and a length at least equal to the corresponding thickness of the said wall of the support, the said generally transverse flanks being adapted to engage on either side of the said wall of the support in such a way as to enable the retaining ring to be retained in both longitudinal directions.

Preferably, at least one of the two said flanks includes a portion which is inclined with respect to the said middle zone, and which is spaced outwardly from the latter, defining a divergent portion of the said groove.

According to an important preferred feature of the invention, the said retaining means include locking means for releasably locking the retaining ring to the mounting pin. Preferably, these locking means are of a unidirectional type, which enable the mounting pin to move in the longitudinal direction appropriate to fitting the said unit to the support while preventing displacement of the unit in the opposite direction.

Preferably, the fastening means include unlocking means for disengaging the locking means from the mounting pin.

According to a further preferred feature of the invention, at least one lateral abutment element is provided. This lateral abutment element is fixed with respect to the said unit, and is adapted to cooperate with the support, and preferably with the contour of the said first part of the mounting hole, in such a way as to prevent or at least to limit any lateral movement of the said unit once the latter has been fitted.

Resilient means are preferably interposed between the unit and the support, and preferably comprise a resilient seal.

According to the invention in a second aspect, a procedure for the automatic fitting of a apparatus (or unit of equipment) on a support, and more particularly the automatic fitting of a lighting and/or indicating means to a motor vehicle, by a fastening means according to the said first aspect of the invention and including at least one mounting pin on which a retaining ring is threaded, is characterised by the following steps performed in succession:

(a) the apparatus is offered up longitudinally in fromt of its final position defined on a wall of the vehicle, in such a way that each retaining ring is in line with a first part of a mounting hole formed in the wall of the vehicle;

(b) the movement of the apparatus towards the wall is continued until each retaining ring penetrates into the said first part, and until the end of at least one lateral abutment element comes into engagement against the said wall of the vehicle;

(c) a lateral displacement is effected in a plane perpendicular to the direction of the said movement towards the wall, in such a way that each retaining ring is engaged in a second part of the mounting hole, whereby the wall is received in the groove of each retaining ring; and (d) the said apparatus is subjected to a further longitudinal force, the magnitude and/or amplitude of which is selected so as to correspond with a predetermined degree of compression of resilient means, for example a resilient seal, and in such a way that during this further longitudinal movement, each retaining ring, retained by the wall of the vehicle, is secured immovably, with each mounting pin being displaced within the corresponding retaining ring.

It will be appreciated that the arrangement and procedure (or method) in accordance with the invention enables the lamp unit to be fitted automatically entirely from outside the vehicle without any need for any associated operation to be carried out within the vehicle body. It will also be appreciated that the invention avoids the need for the use of any high precision components for fastening the unit or apparatus to the vehicle body; and that subsequent fitting and replacement by the user are particularly easy.

Further features and advantages of the invention will appear more fully from a reading of the description which follows, of a preferred embodiment of the invention, given by way of example only and with reference to the accompanying drawings.

BRIEF DESCRIPTION OF THE DRAWINGS

FIGS. 4 to 7 show how such a retaining ring is positioned at different stages in the fitting process.

DESCRIPTION OF A PREFERRED EMBODIMENT OF THE INVENTION

Figure 1:
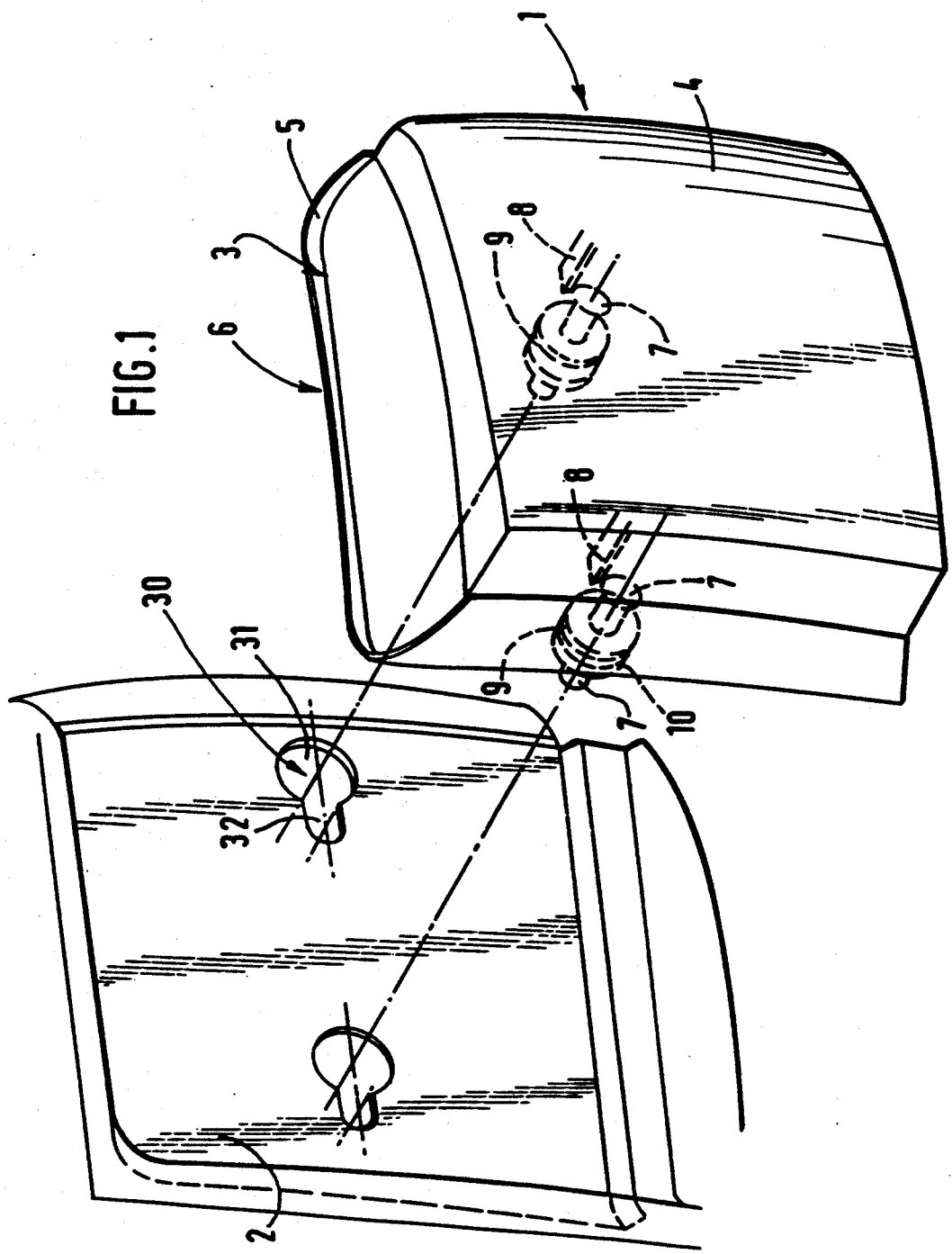
FIG. 1 is a diagrammatic perspective view showing a multiple indicator lamp unit for a motor vehicle, and part of the vehicle body wall to which it is fastened.

The arrangement shown in FIG. 1 comprises an apparatus or unit of equipment, in the form of a multiple rear indicator lamp unit 1 for a motor vehicle. The unit 1 is arranged to be mounted on a support. As shown in FIG. 1, this support is defined by the rear transverse wall 2 of the body of a motor vehicle.

The lamp unit 1 comprises a body member 3 on which a lens 4 is mounted. The lens 4 comprises a plurality of transparent elements, which may be coloured or uncoloured and which correspond to the various indicating functions of the lamps in the unit. Within the lamp unit, a plurality of electric bulbs are mounted, these being connected to one or more electrical supply connectors, not shown. A resilient seal 5 provides continuous sealing around the perimeter of the base 6 of the body member 3. The function of the resilient seal 5 is to ensure tht the lamp unit 1 is mounted sealingly on the rear transverse wall 2 of the vehicle body. It also provides a resilient cushion interposed between the lamp unit and the support.

At least one mounting pin 7 extends from the base 6 of the body member 3, within the envelope defined by the perimeter seal 5. In practice there is more than one of these mounting pins 7, and in the example shown in FIG. 1 there are two. Each mounting pin 7 extends transversely with respect to the base 6. In this example, each mounting pin 7 is in the form of a threaded bolt. However, in a modification it could take the form of a pin or dowel having knurls or parts of knurls. In yet another modification it could simply be a smooth pin.

A lateral abutment element 8, which is fixed with respect to the base 6 of the body member 3, is associated with at least one of the mounting pins 7. Each of these abutment elements 8 extends substantially parallel to the associated pin 7, and is arranged within the continuous perimeter defined by the resilient seal 5.

Retaining means 9 are mounted on each mounting pin 7. As can be seen from FIGS. 2 and 3 in particular, the retaining means 9 comprise a retaining ring 10 which is generally in the form of a cylinder having a circular cross section. In a middle zone of the retaining ring 10, considered longitudinally of the latter, the retaining ring has a peripheral groove 14 having a base surface 15 and two transverse flanks 11 and 12, separated by the middle zone 13. Each of the flanks 11 and 12 of the groove 14 includes an inclined portion 11a and 12a respectively, so that the groove is flared.

The retaining ring 10 has a central, coaxial, cylindrical hole 16 by which it is engaged on the associated mounting pin 7. Two parallel, transverse slots 18 and 19 extend in a common sliding plane on that side of the outer end face 17 of the retaining ring 10 associated with the end of the mounting pin 7 which is opposed to the base 6 of the body member 3. The slots 18 and 19 are open into a wide transverse slot 20 in the form of a parallelepiped.

Figure 3:
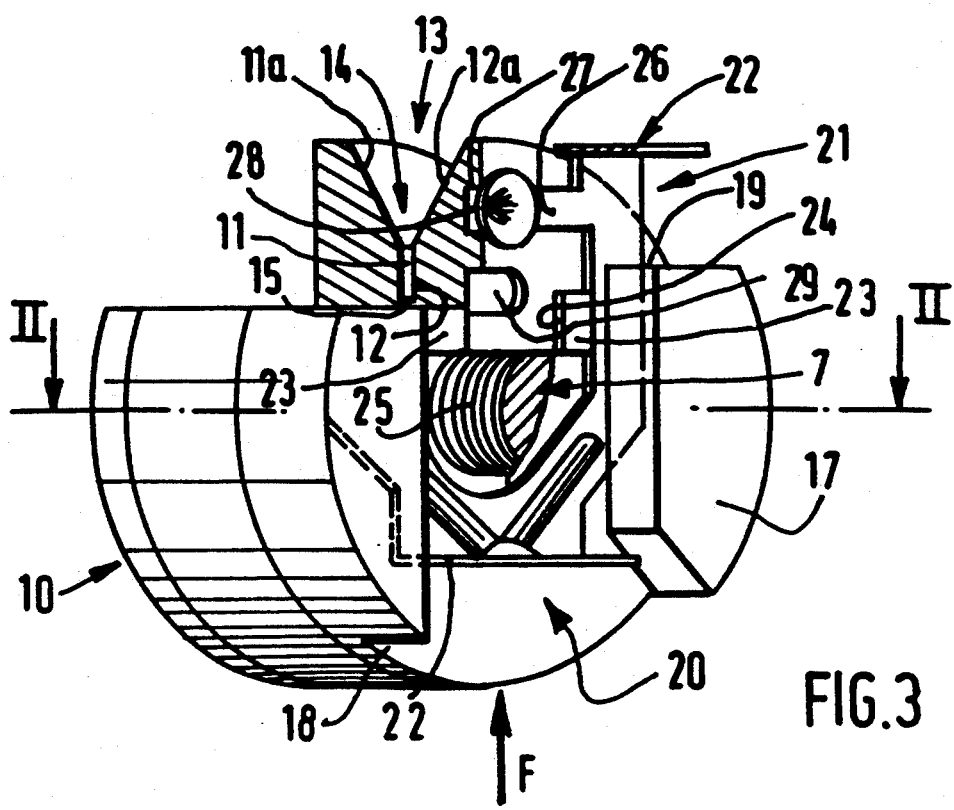
FIG. 3 is a perspective view of the same retaining ring, shown partly cut away and partly in cross section.

A locking key is slidingly mounted in the parallel slots 18 and 19. This locking key constitutes a releasable securing means. With reference in particular to FIG. 3, the locking key 21, which is of sheet metal, has two plate-like, generally flat, flank portions which are inserted in the parallel slots 18 and 19 and which are separated by an aperture. Two manipulating flanges 22, perpendicular to the flat flank portions, are carried by the latter.

Figure 2:
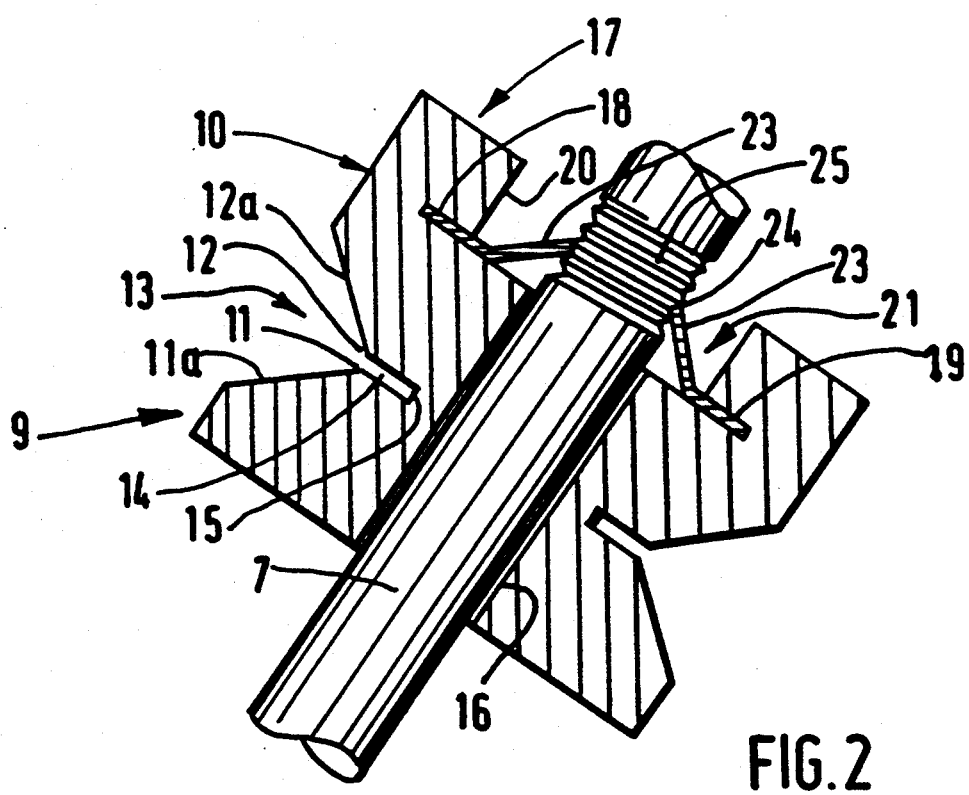
FIG. 2 is a cross sectional view, taken on the line II-II in FIG. 3, of a retaining ring of the fastening means.

Two opposed lugs 23 project from the periphery of the locking key. These lugs 23 are spaced inwardly from the slots 18 and 19 and are inclined outwardly from the plate-like main part of the locking key which includes the above mentioned flank portions. The lugs 23 define between them a gap which is narrower than the outer diameter of the mounting pin 7. As shown in FIGS. 2 and 3, these inclined lugs 23 engage through their ends 24 in the thread 25 of the mounting pin 7. The angle by which the lugs 23 are inclined is such that they enable the mounting pin 7 to move in the ring 10 in the longitudinal direction which corresponds to insertion of the pin 7 in the retaining ring 10, but not in the opposite direction.

The locking key 21 also includes a resilient locating finger 26, which has an enlarged portion 27 at its end. This enlarged portion locates in one or other of two index notches 28 and 29, which are formed in the base of the transverse slot 20 of the retaining ring 10.

The locking key 21 is thus displaceable between two positions. The first of these positions corresponds to a first situation in which the lugs 23 are engaged, as described above, in the thread 25 of the mounting pin 7. The second of the above mentioned positions corresponds to a second situation, in which the inclined lugs 23 are displaced sideways away from the thread 25. In this second position, the locating means (comprising the resilient finger 26) is unlocked: the elements whereby the locking key is displaced from its first position to its second position constitute an unlocking system. Manipulation of the locking key 21 into one or other of these two positions is achieved using the manipulating flanges 22.

The rear wall 2 of the vehicle body is pierced with mounting holes 30. The number and positions of these mounting holes 30 correspond to the number and positions of the mounting pins 7 in the lamp unit 1. Each mounting hole 30 comprises a first part 31, which is circular as shown in FIG. 1 and which is extended laterally in a second part 32, which is narrower and elongated. Each mounting hole 30 is thus generally banjo-shaped, and comprises a locking hole.

The width of the second part 32 of each locking hole 30 is smaller than the diameter of the retaining ring 10, but slightly greater than the diameter of the ring 10 in the middle portion 13. The width of the groove 14 is also slightly greater than the thickness of the rear wall 2 of the vehicle body.

The arrangement described above enables the retaining ring 10 to be introduced longitudinally into the first part 31 of the mounting hole 30, and then to be displaced sideways into the second part 32 of the hole 30, so that the retaining ring is then retained longitudinally in the latter by cooperation of the flanks 11 and 12 of the groove 14 with the two opposed faces of the vehicle body rear wall 2. In this position, in which the retaining ring 10 is held longitudinally in both directions by the rear wall 2, the multiple indicator lamp unit 1 can be offered up to the rear wall 2; but it is then impossible to remove it.

The height of the lateral abutment element 8 and the lateral spacing between the latter and the corresponding mounting pin 7 are such that, once the lamp unit 1 has been fitted in position, the abutment element 8 is engaged in the first part 31 of the mounting hole 30, in such a way as to prevent (or at least to limit) any sideways movement of the retaining ring 10 from the first part 31 towards the second part 32 of the mounting hole. This ensures that the retaining ring 10 cannot accidentally escape from the holes 30, and thus prevents the multiple indicator lamp unit 1 from becoming detached.

The length of the mounting pins 7, the height of the corresponding lateral abutment elements 8, and the thickness of the resilient seal 5, are such that, firstly, the mounting pin 7 is longer than the associated lateral abutment element 8, and secondly, the latter extends slightly beyond the resilient seal 5, even when the latter is not compressed.

Before the multiple indicator lamp unit 1 is fitted to the vehicle, those of its components that play a part in its mounting on the vehicle body are fitted as indicated below.

One retaining ring 10 is threaded on to each mounting pin 7. It is locked on to the mounting pin by means of the locking key 21, in a position such that the flank 11 of the groove 14 that lies on the same side of the latter as the lamp unit 1 is at substantially the same level as the end of the lateral abutment element 8. In a modification (not shown), the groove 14 of the retaining ring 10 has a degree of axial elasticity, and its width corresponds to, or is slightly smaller than, the thickness of the rear wall 2 of the vehicle body. Once the retaining ring 10 is engaged with the wall 2, so as to straddle the latter and to grip it resiliently, the retaining ring is restrained against any possible lateral displacement.

In another modification, again not shown, at least one, and preferably each of two, mounting pins 7 includes a transversely enlarged portion, substantially halfway along its length, which is adapted to constitute an abutment surface for cooperation with a retaining ring 10, in such a way as to limit the fitting of the mounting pins 7 at the end of the operation of fitting the multiple indicator lamp unit 1. Such an enlarged portion preferably comprises a nut which is secured to the mounting pin 7. The longitudinal portion of this transversely enlarged section is such that the latter lies at a distance from the body member 3 of the lamp unit 1 that is less than the distance between the body member 3 and the lateral abutment element 8, and less than the distance between the body member 3 and the end of the resilient seal 5.

A procedure will now be described whereby equipment comprising the multiple indicator lamp unit 1 described above is automatically fitted on to a vehicle, and more particularly on the rear wall 2 of the body of the vehicle.

The indicator lamp unit 1, having its retaining rings 10 in the position described above, is offered up longitudinal movement, in front of its eventual fitting position on the rear wall 2 of the vehicle body, preferably using automatic means such as a robot. See FIG. 4. While it is being so offered up, the retaining rings 10 are placed in line with the first part 31 of the corresponding mounting holes 30.

The movement is continued until the retaining rings 10 penetrate into the first hole parts 31, and until the ends of the lateral abutment elements 8 come into engagement against the body wall 2, as indicated in FIG. 5. This brings the grooves 14 of the retaining rings 10 substantially into line with the body wall 2, or at least in line with the inclined portions 11a and 12a of the flanks 11 and 12 of the grooves 14. Since the lateral abutment elements 8 extend slightly beyond the resilient seal 5, the latter is then no longer compressed.

Figure 6:
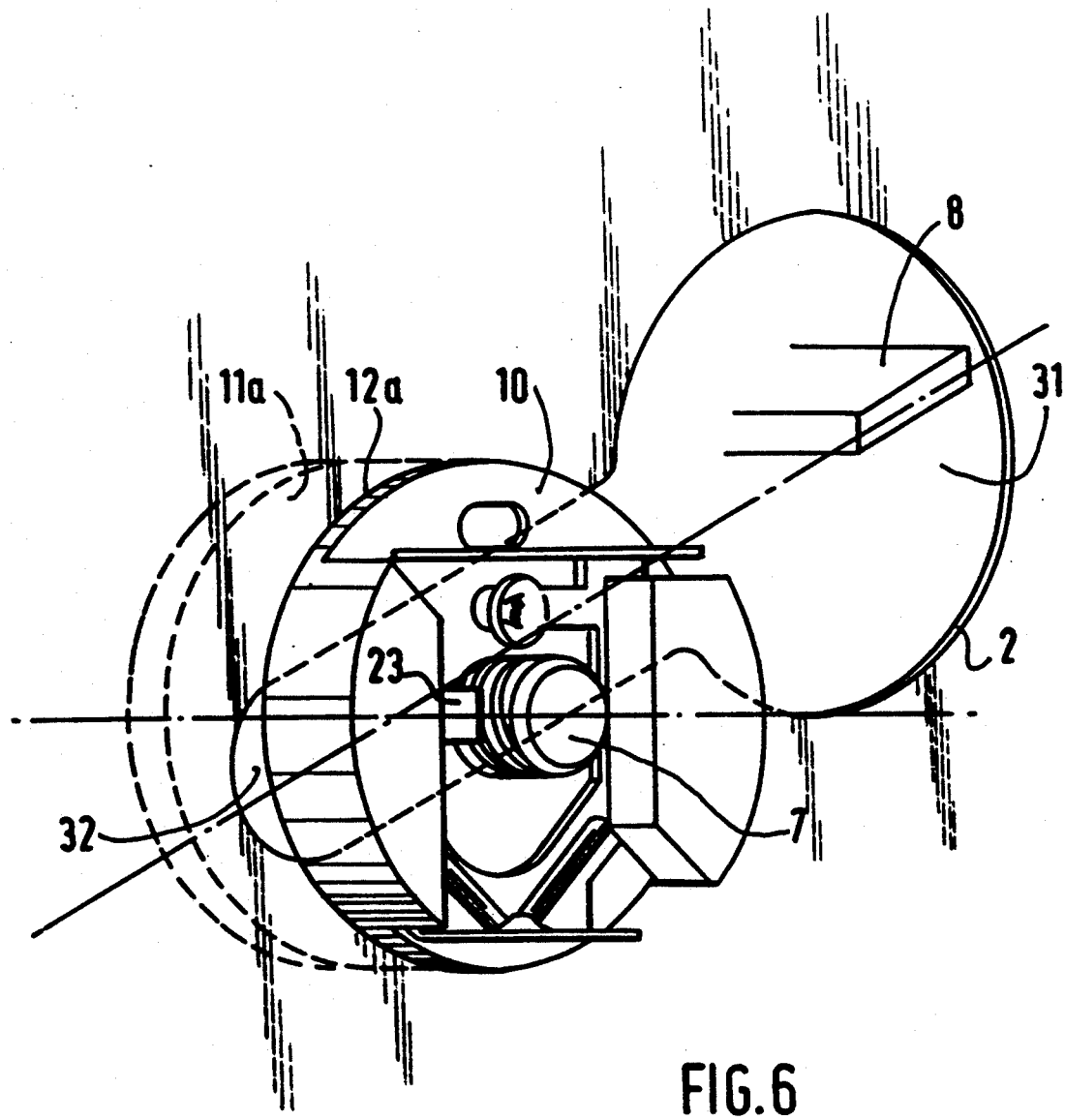

Sideways displacement is then carried out in a plane which is perpendicular to the direction of the previous movement of the lamp unit 1, in such a way that each retaining ring 10 becomes engaged in the second part 32 of the corresponding mounting hole 30, with the rear body wall 2 then being received in the grooves 14 of the retaining rings. This can be seen in FIG. 6. In consequence, the retaining rings 10 are retained in both longitudinal directions by the body wall 2.

During this sideways movement, the lateral abutment elements 8 are displaced across and in contact with the end wall 2. However, in this movement they rub only gently along the body wall, and since these abutment elements are of a plastics material, no damage to the anti-corrosion coating of the body wall 2 takes place as a result.

Figure 7:
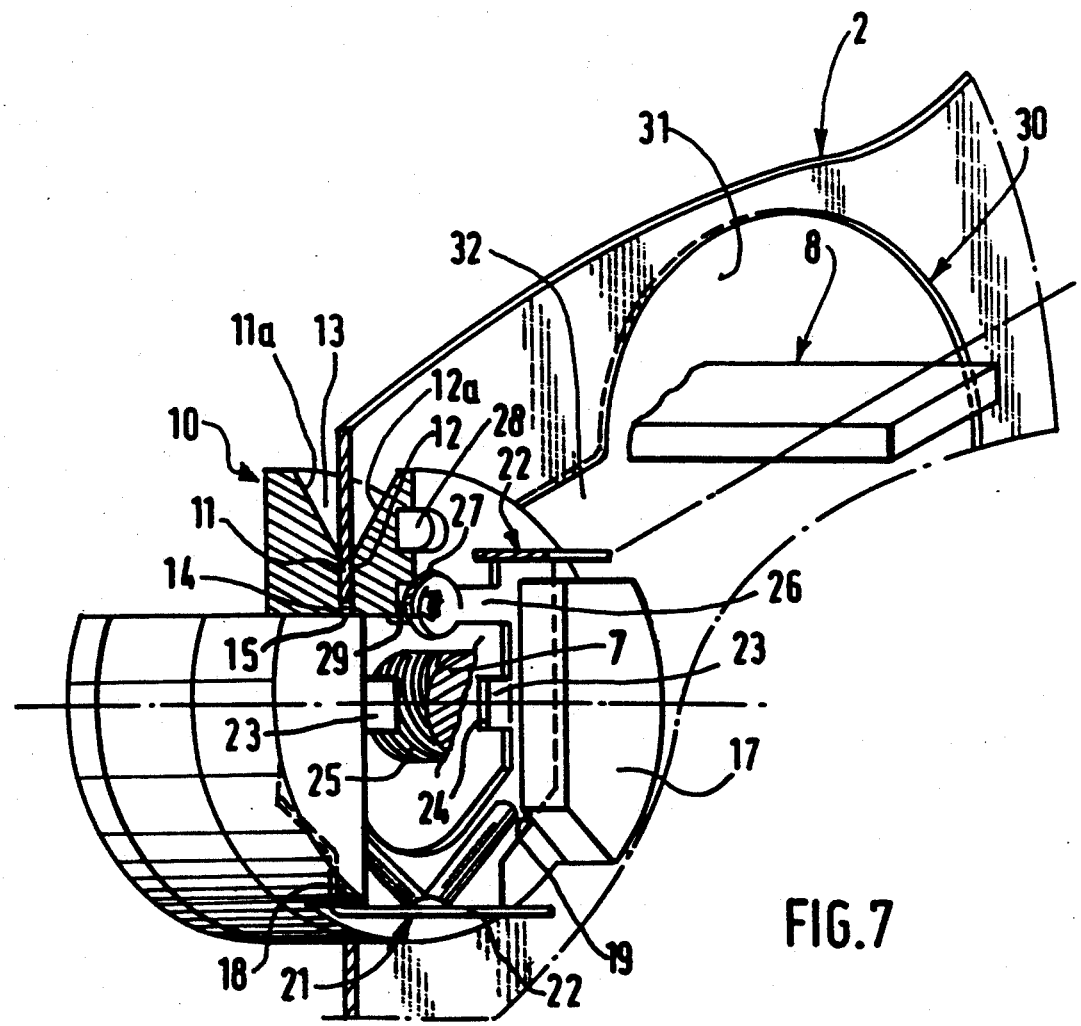

At the end of this lateral movement, the lateral abutment elements 8 lie in line with the first part 31 of the corresponding mounting holes 30, as seen in FIG. 7. The indicating lamp unit 1 is then subjected to a further longitudinal thrust, the force applied being chosen so as to correspond to a predetermined compression of the resilient seal 5. In a modification, this longitudinal thrust is limited in amplitude by the optional transversely enlarged portions, described above, of the mounting pins 7 coming into engagement against the retaining rings 10. In the course of this final longitudinal movement, the retaining rings 10, retained by the rear body wall 2, are of course now stationary. The mounting pins 7 thus become displaced inside the retaining rings 10, in the one direction that is permitted by the uni-directional locking means 21.

Fitting is now complete, and the multiple indicator lamp unit 1 is firmly, but resiliently and sealingly, held against the rear body wall 2 of the vehicle without it being possible for it to become dislodged by being simply pulled away, this being prevented by the uni-directional locking means already described. In addition, any lateral movement is prevented by the cooperation of at least one transverse abutment element 8 with the profile of the first part 31 of the corresponding mounting hole 30. However, as will be seen below, the arrangement described above does in fact enable the lamp unit 1 to be removed and refitted very easily, when it becomes necessary to perform any operation on the lamp unit (for example to change a light bulb).

Removal of the lamp unit is achieved by operating the unidirectional locking means. To this end, all that is needed is to pull the manipulating flange 22 of each locking key 21 in the direction of the arrow F in FIG. 3, until the inclined lugs 23 of each locking key 21 are disengaged sideways from the threads 25 of the mounting pin 7. The lamp unit 1 can then simply be removed longitudinally, with the retaining rings 10 remaining secured in the rear body wall 2. Thus it can be seen that this removal operation is particularly simple and quick and requires no tools. The lamp unit 1 can then be refitted in various ways. Since the retaining rings remain in the position in which they were placed at the end of the automatic fitting operation, the locking keys 21 are then returned to their position in which the inclined lugs 23 and engaged in the thread 25 of the corresponding mounting pin 7. The lamp unit 1 is then offered up manually in such a way that the mounting pins 7 penetrate into the cylindrical holes 16 of the retaining rings 10. It is only necessary then to exert a pressure great enough to apply the lamp unit against the rear body wall 2 so as to compress the resilient seal 5.

In a modification, refitting can be carried out in the same way as in the automatic assembly operation. To this end, the retaining rings 10 are removed from the rear body wall 2, with each retaining ring then being replaced on a mounting pin 7 in the initial position for automatic fitting, in the manner described above.

Other modifications may also be envisaged without departing from the scope of the present invention. In particular, each mounting pin 7 may be in the form of a pin or dowel which is simply knurled, or may even be a smooth pin on which the inclined lugs 23 of the locking keys 21 are engaged in a cantilevered manner in such a way as to prevent any movement in the removal direction, while permitting movement in the fitting direction, that is to say the direction in which the mounting pins 7 are inserted into the retaining rings 10.

What is claimed is:

1. An arrangement comprising a support and a unit of equipment removably mounted on the support, the support defining a support wall and the arrangement further including fastening means for removably securing the said unit to the support wall, the said fastening means comprising at least one combination of elements wherein each said combination includes a mounting hole formed through the support wall, a mounting pin carried by the said unit for extending removably through the said mounting hole, and retaining means adapted to engage on the mounting pin and to bear against the support wall so as to secure the mounting pin and therefore the said unit to the support wall, and wherein, in the or each said fastening means:

(a) the mounting hole comprises a first part having transverse dimensions such as to enable the said retaining means to pass freely through it, and a second part laterally extending the said first part, the dimensions of the second part being smaller than those of the said retaining means whereby to retain the latter in the said second part of the hole;

(b) the retaining means comprise a retaining ring having a peripheral groove defining a pair of generally transverse flanks and a middle zone separating the said flanks, the transverse dimension of the said flanks being inferior to those of the said second hole part and the longitudinal extent of the said groove being at least equal to that of the corresponding thickness of the support wall, and wherein the said retaining means further comprises a locking means carried by the retaining ring and releasably engaging the said mounting pin, whereby the said generally transverse flanks are adapted to engage on either side of the support wall so as to retain the retaining ring in both longitudinal directions.

2. An arrangement according to claim 1, wherein at least one of the said pair of flanks includes a portion which is inclined with respect to the said middle zone and which extends outwardly from the latter so as to define a flared portion of the said groove.

3. An arrangement according to claim 1, wherein at least one said fastening means further includes a lateral abutment element which is fixed in the said unit for cooperating with the support and with the contour of the said first part of the corresponding mounting hole.

4. An arrangement according to claim 1, wherein the said locking means are of a uni-directional type enabling the mounting pin to be displaced in the direction of fitting of the said unit to the support but preventing its displacement in the opposite direction.

5. An arrangement according to claim 1, wherein the retaining means further includes unlocking means comprising cooperating elements of the retaining ring and the locking means.

6. An arrangement according to claim 5, wherein the retaining ring has parallel slots formed in it and defining a sliding plane, the releasable locking means comprising the said slots and a locking key mounted slidingly in the said slots along the said sliding plane, the locking key having at least two opposed lugs spaced away from the said slots in the retaining ring and projecting inwardly from the periphery of the key to define between them a space narrower than the outer diameter of the mounting pin, the said lugs being inclined to the sliding plane.

7. An arrangement according to claim 3, further including resilient means interposed between the said unit and the support, wherein the said resilient means comprise a resilient seal defining a continuous perimeter, which itself defines an envelope within which the said mounting pins and lateral abutment elements lie.

8. An arrangement according to claim 7, wherein the length of the mounting pin, the height of the lateral abutment element and the thickness of the resilient seal are such that, firstly, the mounting pin is longer than the lateral abutment, and secondly the lateral abutment element extends slightly beyond the resilient seal even when the latter is uncompressed.

9. A method of automatically fitting a unit of equipment to a support, the said unit and support together constituting an arrangement according to claim 7 or claim 8, the method comprising the following steps in succession:

(a) the said unit is presented in front of the location in which it is to be fitted on the said support wall, with the or each retaining ring aligned with the said first part of a corresponding said mounting hole in the wall;

(b) the unit is offered up to the wall by longitudinal movement, until the or each retaining ring penetrates into the corresponding said first hole part, and until a free end of at least one said lateral abutment element of the said unit comes into engagement against the support wall;

(c) the said unit is displaced laterally in a plane perpendicular to the direction of the said longitudinal movement, so that the or each retaining ring engages in the said second part of the associated mounting hole with the support wall, the wall being received in the said peripheral groove or grooves of the retaining ring or rings; and (d) a longitudinal force is supplied to the said unit, so as to compress the said resilient means by a predetermined amount, whereby to immobilise the or each retaining means on the support wall and to displace the or each mounting pin within the corresponding retaining ring.

* * * * *